US012412222B2

United States Patent
McCall et al.

(10) Patent No.: US 12,412,222 B2
(45) Date of Patent: Sep. 9, 2025

(54) SYSTEM AND METHOD FOR DATA SYNCHRONIZATION AND VERIFICATION

(71) Applicant: VALID8 FINANCIAL INC., Seattle, WA (US)

(72) Inventors: Christopher Donald McCall, Boulder, CO (US); David Austin Gallant, Denver, CO (US); Tod Robert McDonald, Seattle, WA (US)

(73) Assignee: VALID8 FINANCIAL INC., Seattle, WA (US)

( * ) Notice: Subject to any disclaimer, the term of this patent is extended or adjusted under 35 U.S.C. 154(b) by 0 days.

(21) Appl. No.: 17/347,026

(22) Filed: Jun. 14, 2021

(65) Prior Publication Data

US 2021/0304323 A1    Sep. 30, 2021

Related U.S. Application Data (63) Continuation of application No. 16/742,646, filed on Jan. 14, 2020, now Pat. No. 11,062,400.

(51) Int. Cl.
   *G06Q 40/12* (2023.01)
   *G06F 18/2321* (2023.01)
   (Continued)

(52) U.S. Cl.
   CPC ....... *G06Q 40/125* (2013.12); *G06F 18/2321* (2023.01); *G06F 21/16* (2013.01);
   (Continued)

(58) Field of Classification Search
   CPC .... G06Q 40/125; G06F 21/16; G06K 9/6221; G06N 20/00; G06N 3/0445; G06N 3/084; H04L 9/32; H04L 2209/56
   See application file for complete search history.

(56) References Cited

U.S. PATENT DOCUMENTS

| 5,642,478 A | * | 6/1997 | Chen | ................ | G06F 11/3636 |
| | | | | | 714/E11.215 |
| 7,383,233 B1 | | 6/2008 | Singh et al. | | |

(Continued)

FOREIGN PATENT DOCUMENTS

| AU | 2021207647 | 7/2022 |
| CA | 3164054 | 7/2021 |

(Continued)

OTHER PUBLICATIONS

PCT Application No. PCT/US2021/013424 International Search Report and Written Opinion dated Feb. 25, 2021.

(Continued)

*Primary Examiner* — Peter Ludwig
(74) *Attorney, Agent, or Firm* — Polsinelli LLP (57) ABSTRACT

The present disclosure is directed to transforming a data set of discrete records, tracing unrelated entries across the records, and verifying the traces using independently-sourced external data. In one aspect, a system includes memory and one or more processors configured to execute the computer-readable instructions to receive a first set of data, the first data set including multiple discrete financial records of an entity; apply a set of logics to the first data set to identify a plurality of traces, each of the plurality of traces associating discrete entries across one or more of the multiple financial records; performing a verification process to verify the plurality of traces against a second data set for the entity, the second data set being independently sourced from a third party entity to yield a verification result; and prepare an output of the verification result to be presented on a display.

20 Claims, 7 Drawing Sheets

(51) Int. Cl.
*G06F 21/16* (2013.01)
*G06N 20/00* (2019.01)
*H04L 9/32* (2006.01)

(52) U.S. Cl.
CPC .............. *G06N 20/00* (2019.01); *H04L 9/32* (2013.01); *H04L 2209/56* (2013.01)

(56) References Cited

U.S. PATENT DOCUMENTS

| | | | | |
|---|---|---|---|---|
| 8,364,720 | B2* | 1/2013 | Levy | H04N 21/2343 |
| | | | | 707/812 |
| 8,442,880 | B1 | 5/2013 | Fox | |
| 8,589,268 | B2 | 11/2013 | Hahn-Carlson | |
| 9,842,139 | B1* | 12/2017 | Cohen | G16Z 99/00 |
| 10,504,174 | B2 | 12/2019 | Loganathan et al. | |
| 10,893,059 | B1* | 1/2021 | Aziz | G06F 21/53 |
| 11,062,400 | B1 | 7/2021 | McCall | |
| 11,074,283 | B2* | 7/2021 | Filippi | G06F 16/345 |
| 11,196,614 | B2* | 12/2021 | Mortensen | G06N 3/0427 |
| 2002/0077940 | A1 | 6/2002 | Riley | |
| 2007/0043452 | A1* | 2/2007 | Buscema | G06N 3/048 |
| | | | | 706/2 |
| 2007/0066298 | A1* | 3/2007 | Hurst | H04W 24/00 |
| | | | | 455/423 |
| 2008/0120129 | A1 | 5/2008 | Suebert et al. | |
| 2011/0153480 | A1 | 6/2011 | Zinow et al. | |
| 2011/0153817 | A1* | 6/2011 | Wright | G06F 11/3476 |
| | | | | 709/224 |
| 2013/0339931 | A1* | 12/2013 | Rode | G06F 11/261 |
| | | | | 717/128 |
| 2014/0258169 | A1 | 9/2014 | Wong et al. | |
| 2014/0278055 | A1* | 9/2014 | Wang | G01C 21/3841 |
| | | | | 701/409 |
| 2015/0058605 | A1* | 2/2015 | Madampath | G06F 9/30145 |
| | | | | 712/234 |
| 2015/0213444 | A1 | 7/2015 | McEntee et al. | |
| 2016/0217436 | A1 | 7/2016 | Brama | |
| 2017/0091320 | A1 | 3/2017 | Psota et al. | |
| 2017/0103391 | A1 | 4/2017 | Wilson et al. | |
| 2018/0005111 | A1* | 1/2018 | Chaudhari | G06N 3/084 |
| 2018/0300625 | A1* | 10/2018 | Esman, Sr. | H04L 63/1408 |
| 2018/0350180 | A1 | 12/2018 | Onischuk | |
| 2019/0012695 | A1 | 1/2019 | Bishnoi et al. | |
| 2019/0018904 | A1* | 1/2019 | Russell | G06F 16/27 |
| 2019/0026839 | A1 | 1/2019 | Drangmeister et al. | |
| 2019/0141006 | A1 | 5/2019 | Schnitt | |
| 2019/0244241 | A1 | 8/2019 | Hain | |
| 2019/0378017 | A1* | 12/2019 | Kung | G06N 3/063 |
| 2020/0012980 | A1 | 1/2020 | Li et al. | |
| 2020/0328807 | A1* | 10/2020 | Jiang | H04B 10/40 |
| 2020/0349441 | A1* | 11/2020 | Zhang | G06N 3/047 |
| 2021/0217103 | A1 | 7/2021 | McCall et al. | |
| 2022/0044119 | A1* | 2/2022 | Wang | G06N 3/045 |
| 2025/0232385 | A1 | 7/2025 | McCall et al. | |

FOREIGN PATENT DOCUMENTS

| | | |
|---|---|---|
| EP | 4091122 | 11/2022 |
| WO | WO 2021/146414 | 7/2021 |

OTHER PUBLICATIONS

PCT Application No. PCT/US2021/013424 International Preliminary Report on Patentability dated Jul. 19, 2022.
EP Application No. 21741120.6 Extended European Search Report dated Oct. 25, 2023, 9 pages.
JIT Trace-based verification for high-level synthesis (Dec. 2015).
U.S. Appl. No. 16/742,646, Office Action dated Mar. 17, 2020.
U.S. Appl. No. 16/742,646, Final Office Action dated Jun. 15, 2020.
U.S. Appl. No. 16/742,646, Office Action dated Jan. 26, 2021.

* cited by examiner

SYSTEM AND METHOD FOR DATA SYNCHRONIZATION AND VERIFICATION

CROSS-REFERENCE TO RELATED APPLICATION

The present application is a continuation and claims the priority benefit of U.S. patent application Ser. No. 16/742,646 filed Jan. 14, 2020, which is incorporated herein by reference in its entirety.

FIELD OF THE DISCLOSURE

The present disclosure is generally related to data management and verification and more particularly to novel and unique transformation of data sets and comprehensive verification thereof using independently sourced data.

BACKGROUND

Organizations such as business, corporations and various types of institutions are continuously evolving and so do their business practices. In order to maintain a healthy economy and trustworthy environment for businesses to thrive in, it is critical to ensure that all players play by the same rules. One way to ensure adherence to these rules is through auditing financial records and statements of such organizations. Auditing is a tool that relies on random sampling and verification of entries in financial records of a given institution to verify corresponding balances.

Random sampling represents selecting a small percentage of all entries on a given financial record (e.g., entries on an Income Statement of a company), which even when verified, still leaves the door open that problematic entries remain undetected thus undermining the objective of trustworthy auditing financial records of an organization.

Therefore, an improved scheme is needed to reduce/eliminate the possibility of any problematic entry in a financial record of an organization remaining undetected and thus increase the overall trustworthiness of audited records of an organization.

SUMMARY

One or more example embodiments of inventive concepts are directed to providing systems, methods and computer-readable media that transform a given data set formed of multiple discrete records such that unrelated entries across the multiple discrete records are analyzed and associations there between are traced and identified. Associated entries are then compared to independently-sourced external data to verify the validity (or invalidity) thereof. This process may be referred to as trace-based data verification. As will be described throughout this disclosure, a non-limiting example application of the above process is the auditing of financial statements and records of organizations (such as corporations, institutions, businesses, non-profits, etc.).

One aspect of the present disclosure includes a system with memory having computer-readable instructions stored therein and one or more processors. The one or more processors are configured to execute the computer-readable instructions to receive a first set of data, the first data set including multiple discrete financial records of an entity; apply a set of logics to the first data set to identify a plurality of traces, each of the plurality of traces associating discrete entries across one or more of the multiple financial records; performing a verification process to verify the plurality of traces against a second data set for the entity, the second data set being independently sourced from a third party entity to yield a verification result; and prepare an output of the verification result to be presented on a display.

One aspect of the present disclosure includes one or more non-transitory computer-readable medium having computer-readable instructions stored therein, which when executed by one or more processors, cause the one or more processors to receive a first set of data, the first data set including multiple discrete financial records of an entity; apply a set of logics to the first data set to identify a plurality of traces, each of the plurality of traces associating discrete entries across one or more of the multiple financial records; performing a verification process to verify the plurality of traces against a second data set for the entity, the second data set being independently sourced from a third party entity to yield a verification result; and prepare an output of the verification result to be presented on a display.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are given in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As briefly mentioned above, the present disclosure is directed to providing a system that transforms a given data set formed of multiple discrete records such that unrelated entries across the multiple discrete records are analyzed and associations there between are identified. Associated entries are then compared to independently-sourced external data to verify the validity (or invalidity) thereof. This process may be referred to as a data verification process.

A non-limiting example application of the above process is the auditing of financial statements and records of organizations (such as corporations, institutions, businesses, non-profits and/or any other type of known or to be created structure or organization having financial transactions subject to global, federal, state and/or local financial regulations and audits). In particular, a data set representing financial statements of a given organization may include different and discrete financial statements including, but not limited to, a balance sheet, an income statement, a cash journal, an account receivables statement, an account payables statement, an assets statement and a liability statement. Each of these financial records may be a table having multiple entries (with corresponding dates, amounts, descriptions, etc.) and a total balance entry, as is known according to prevalent industry practices.

Existing and known auditing methods include taking any one such financial record and based on random sampling, extract a few entries (as a percentage of the total entries of that particular financial record) and verify the extracted and randomly selected entries using independent sources such as bank statements in order to verify the total balance of that particular financial record.

For example, assuming that an organization sells several products for a total of $10,000 with payments due after delivery of each different product and using a portion of the $10,000 proceeds to purchase raw material, different financial records of the organization (e.g., account receivables record, income statement, balance sheet, cash journal, account payables record, etc.) may have one or more entries associated with the transaction for selling the products. Existing methods take each different financial record and performs a separate verification process on each record using random sampling described above.

As mentioned, this process is vulnerable and significantly prone to being inaccurate as many entries that may be problematic (e.g., being indicative of or constituting a red flag as to suspicious accounting and financial activities) may go undetected due to not being randomly selected for verification. This existing practice may be referred to as balance-based data verification.

The present disclosure presents different approaches whereby, in a data set of multiple financial records, entries (e.g., transactions) across different financial records that are otherwise unrelated are traced and associations there between are detected and identified. This approach results in multiple traces (data traces) to be created and identified across a complete data set representing all financial records of a particular organization. The present disclosure, as will be described below, applies a set of rules and logics across the multiple discrete financial records to identify associated entries to generate trace(s). These traces are then compared to independently-sourced external data (e.g., bank records of the company) to verify that the entries in the financial records are valid and legitimate. Accordingly and in contrast to existing random sampling approach, a significantly larger number of entries of financial records are analyzed and verified thus increasing the credibility and trustworthiness of audited financial records of any given organization. This process may be referred to as trace-based data verification.

With above overview, the disclosure now turns to an example system for implementing trace-based data verification.

Figure 1:
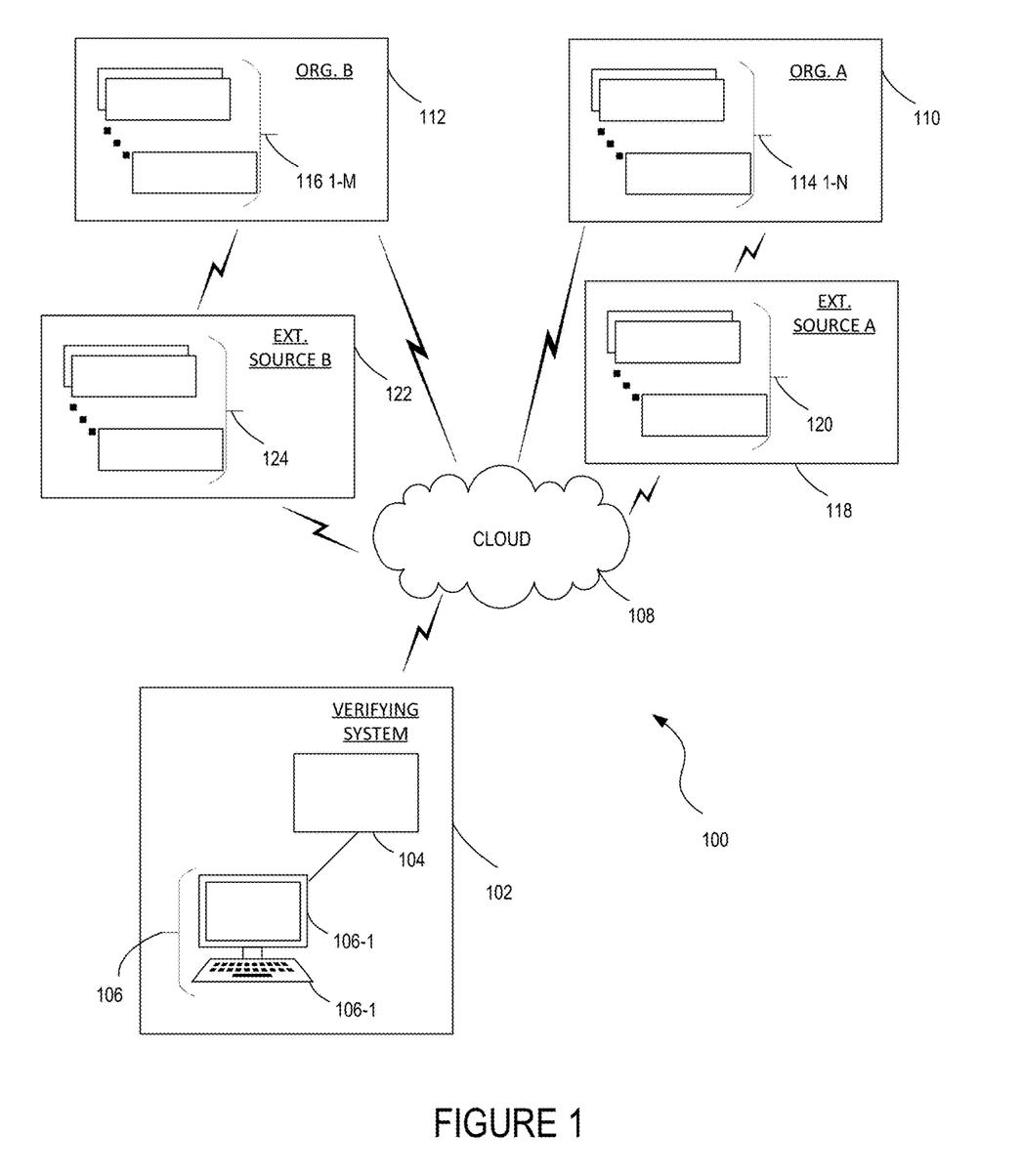
FIG. 1 illustrates a system for data verification, according to some aspects of the present disclosure.

FIG. 1 illustrates a system for data verification, according to some aspects of the present disclosure. Setting 100 of FIG. 1 includes a verifying system 102. Verifying system (or processing system or simply system) 102 may include various components including, but not limited to, server 104 and station 106. Server 104 may include one or more processors that are configured to execute computer-readable instructions to perform trace-based data verification as will be described below. Station 106 may include a display 106-1 on which a graphical user interface (GUI) may be presented to provide command for implementing trace-based data verification that will be described below. Station 106 may optionally include input device 106-2 for inputting and providing commands to carry the trace-based data verification process. Station 106 may be any other known or to be developed end user device including but not limited to, a laptop, a mobile device, a tablet, etc.

In one example, server 104 is located remotely relative to station 106 and may be accessible via cloud 108 using any known or to be developed wired and/or wireless communication scheme. In another example, functionalities of server 104 may be distributed across several servers providing virtual processing power operated by a single or multiple cloud service providers (private, public or hybrid of both).

Setting 100 also illustrates two example organizations, organization A 110 and organization B 112. Number of organizations with data records to be verified by verifying system 102 is not limited to two as shown in FIG. 1 and may be more or less.

Organization A 110 and organization B 112 may each be any type of corporation, for-profit/non-profit institute or organization, company and/other any other type of known or to be created entity engaging in financial transactions subject to global, federal, state and/or local regulations as described above.

Organization A 110 and organization B 112 may each include a data processing system that monitors and records all business related and activities of the company including but not limited to, sales, manufacturing, marketing, human resources, etc. that may be collected, monitored and recorded using what is known in the industry as Enterprise Resource Planning (ERP) software or any other known or to be developed software package. For purposes of the present disclosure, all financial records and data collected using ERP may be referred to as ERP data. As shown in FIG. 1, organization A 110 may have associated ERP records (data set) 114 1-N stored in a relevant database, where N is an integer greater than or equal to 1 and may corresponding to the number of different financial records of organization A 110. Organization B 112 may have associated ERP records (data set) 116 1-M stored in a relevant database, where M is an integer greater than or equal to 1 and may corresponding to the number of different financial records of organization B 112. M and N may be the same or different. As noted above, each one of records 114 1-N and 116 1-M may be a different financial record examples of which include, but are not limited to, a balance sheet, an income statement, a cash journal, an account receivables statement, an account payables statement, an assets statement and a liability statement.

Setting 100 further illustrates an independent external source associated with each of organization A 110 and organization B 112. External source A 118 may be, for example, a financial institution or a bank that organization A 110 uses to conduct financial transactions. Accordingly, external source A 118 may have records stored in a relevant database (independently-sourced data set) 120 that reflect financial transactions of organization A 110, and as will be described below, will be used to verify financial records of organization A 110 using trace-based data verification.

External source B 122 may be, for example, a financial institution or a bank that organization B 112 uses to conduct financial transactions. Accordingly, external source B 122 may have records stored in a relevant database (independently-sourced data set) 124 that reflect financial transactions of organization B 112, and as will be described below, will be used to verify financial records of organization B 112 using trace-based data verification.

In one example, a single external source (either external source A 118 or external source B 122) may be associated with both organizations A 110 and B 112. Furthermore, there may be more than one external source associated with a single organization that has independently-sourced data available to be used in trace-based data verification for that single organization.

As will be described below, verifying system 102 may retrieve any one of data sets (e.g., data sets 114 1-N, 116 1-M, independently-sourced data sets 120 and 124) using any known or to be developed Application Programming Interface (API).

With an example system described with reference to FIG. 1, the disclosure now turns to describing examples of trace-based data verification.

Figure 2:
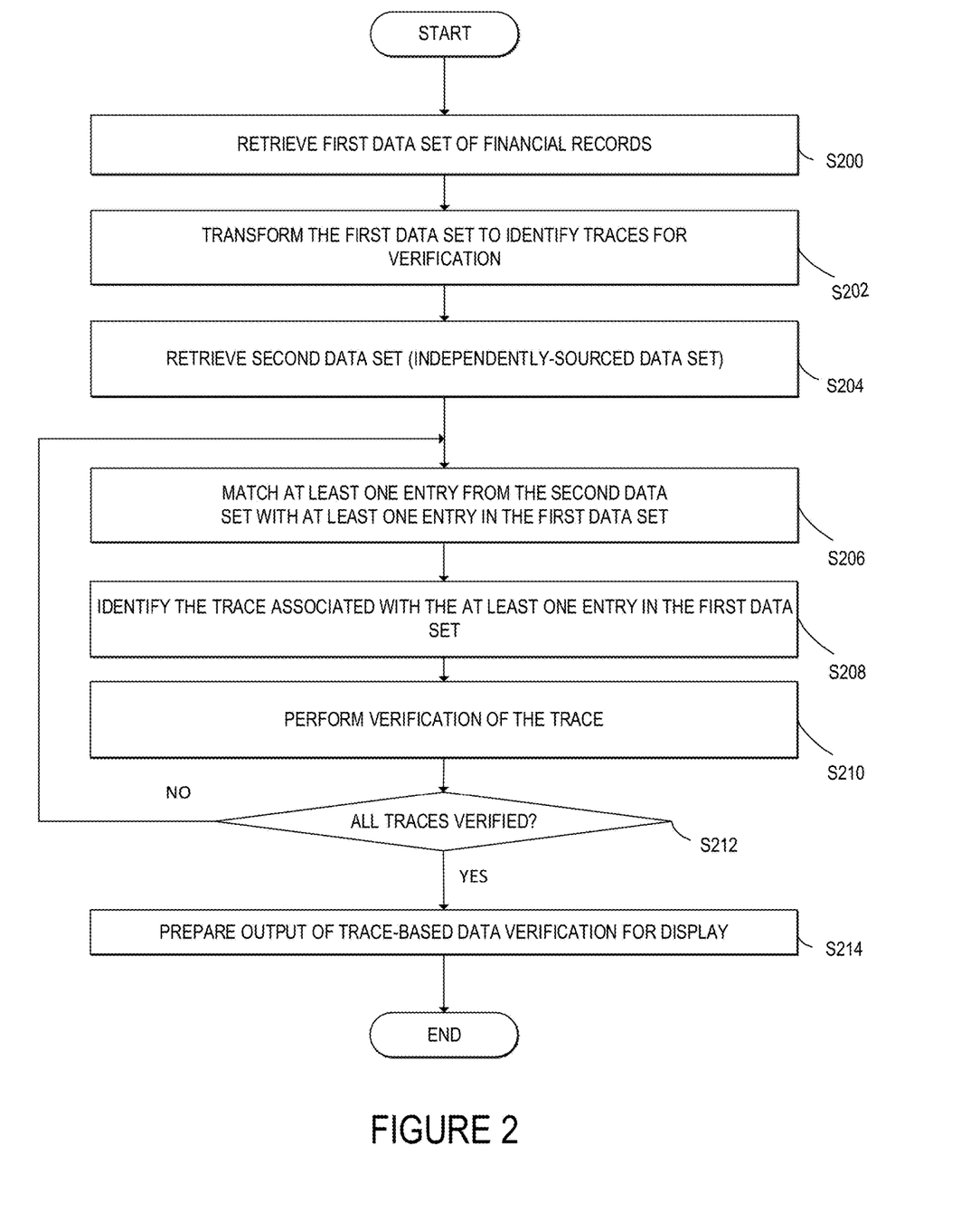
FIG. 2 illustrates a method of data verification, according to some aspects of the present disclosure.

FIG. 2 illustrates a method of trace-based data verification, according to some aspects of the present disclosure. Functionalities and steps of FIG. 2 will be described from the perspective of verifying system 102 of FIG. 1. However, it will be understood by those having ordinary skill in the art that verifying system 102, as described above, may have one or more associated processors that are configured to execute computer-readable instructions stored in associated memories to implement the steps of FIG. 2.

At S200, verifying system 102 retrieves (e.g., via station 106) first data set of an organization/entity. First data set may include various discrete financial records of such organization (e.g., data set 114 1-N of organization A 110 and/or data set 116 1-M of organization B 112) in the ERP format. Such data may be retrieved using an API through which a database of organization A 110 and/or organization B 112 is accessed, data sets 114 1-N and/or 116 1-M are retrieved, standardized according to any known or to be developed method, and prepared for further processing.

At S202, verifying system 102 transforms the first data set to identify traces for verification. In one example, the transformation includes applying a set of logics (rules) to the first data set to identify and create a plurality of traces. A trace may be defined as a link between entries (individual transactions) in the same financial record and/or across separate financial records of the organization that may be related in a particular manner. In other words, a trace may comprise of several entries across one or several financial records. Referring to example described above, assume that an organization (e.g., organization A 110) sells several products for a total of $10,000 with payments due after delivery of each different product and using a portion (e.g., $3000) of the $10,000 proceeds to purchase raw material. Payments totaling $10,000 may be paid over separate installments that result in several entries in the revenue statement of the organization. This may also result in an entry or entries in the account receivables statement of the organization. Assets record of the organization may also be modified to have entri(es) reflecting change in assets. Expense report and/or account payables of the organization may also be modified to have entri(es) reflecting the purchase of raw material. Therefore, a trace may be identified as association of all said example entries across different financial records of the organization.

Figure 4:
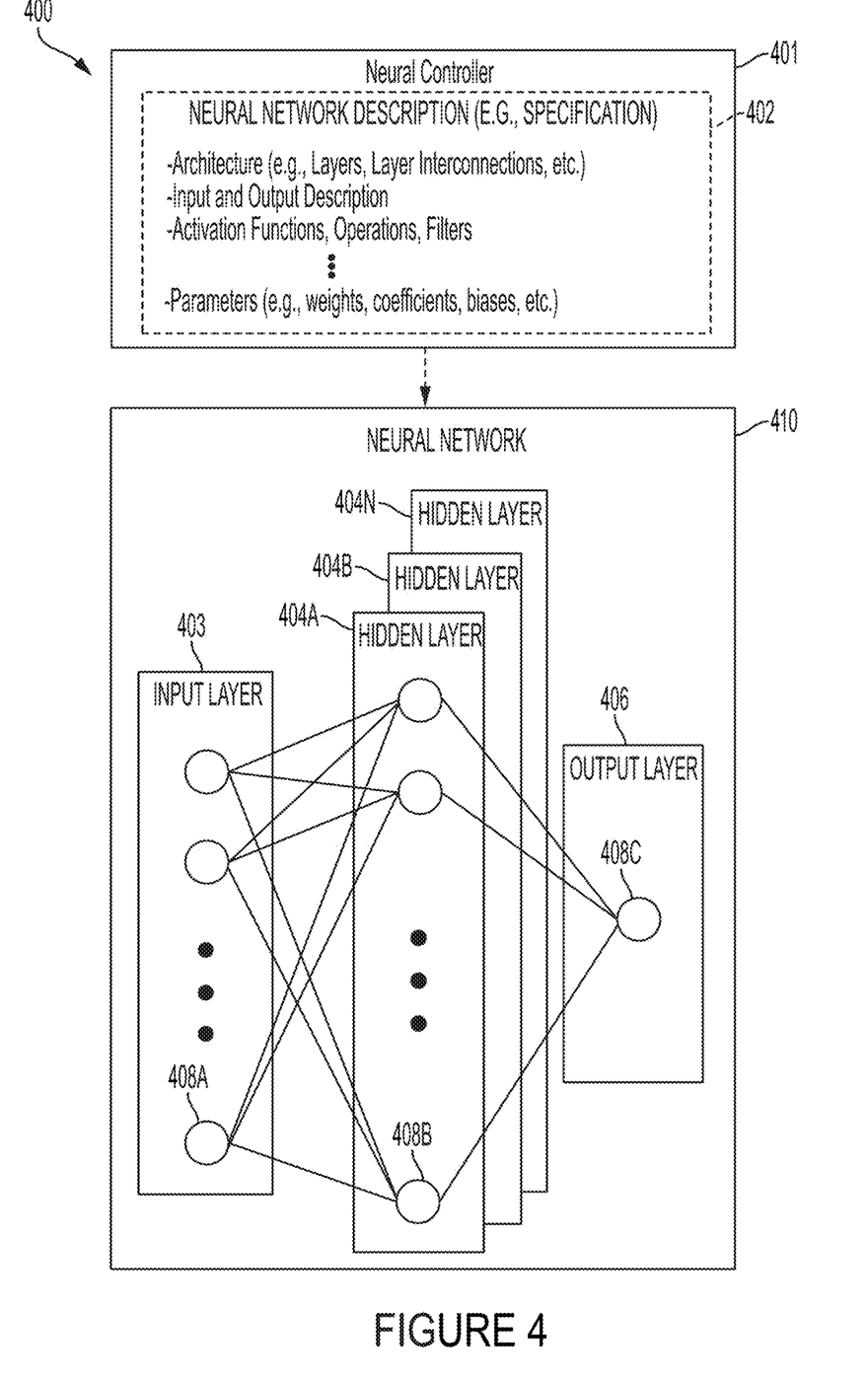
FIG. 4 illustrates an example neural architecture, according to some aspects of the present disclosure.

Set of logics (rules) used to identify associations may be developed using known or to be developed machine learning techniques that over time learn common/specialized associations of data based on various factors including, but not limited to, dates of entries, description of entries, codes identifying transactions and customers, etc. FIG. 4 will describe a machine learning process for developing the set of logics (rules).

At S204, verifying system 102 retrieves a second data set (independently-sourced data set) from another organization (e.g., a bank or a financial institution) associated with a corresponding organization for which first data set is retrieved at S200. For example, second data set for organization A 110 may be retrieved from External Source A 118 and for organization B 112 may be retrieved from External Source B 122. Second data set may include entries (transactions) that identify all financial activities (e.g., deposits, withdrawals, credits, debits, etc.) of the relevant organization and may be retrieved using an API similar to retrieval of first data set as described with reference to S200.

At S206, verifying system 102 identifies a match between at least one entry (e.g., transaction) in the second data set and at least one entry (e.g., transaction) in the first data set. For example, with reference to the example above, there may be three deposits of $3000, $2000 and $5000 in the revenue financial record of organization A 110 corresponding to the total of $10,000 sales of products, all of which are associated with various entries in account receivables, assets, expenses, etc., records of organization A 110. On the other hand, verifying system 102 can identify a deposit of $5000 in the independently-sourced data of the second data, which matches entry of $5000 in the revenue financial record of organization A 110.

At S208, verifying system 102 identifies a trace associated with the at least one entry of the first data set for which a match in the second data set is identified at S206. Referring to the example above, the $5000 entry in the revenue financial record of organization A 110 belongs to a trace formed of three deposits of $3000, $2000 and $5000 in the revenue financial record of organization A 110 corresponding to the total of $10,000 sales of products, all of which are associated with various entries in account receivables, assets, expenses, etc., records of organization A 110.

While in FIG. 2, identification of all traces are shown to take place at S202 and before matching and identification processes of S206 and S208, the present disclosure is not limited thereto and S202 can take place after S206 and S208.

At S210, verifying system 102 performs a verification process on the trace identified at S208 to validate/confirm all, some or none of entries in the identified trace. With reference to example above, the trace has three entries of $3000, $2000 and $5000 in the revenue financial record of organization A 110 along with additional entries in account receivables, assets, expenses, etc., records of organization A 110. The verification process examines each of the other two entries of $3000 and $2000 in the revenue financial to validate them. Verification process also attempts to validate entries of the trace in other financial records. If all entries are validated, verifying system 102 returns a complete verification of the trace. If some entries can be validated, verifying system may return a partial validation of the trace. If none of the entries can be validated, verifying system 102 returns an invalid trace result to be communicated to the system operator as will be described below.

At S212, verifying system 102 determines if all traces identified at S202 have been verified (validated). If not, the process returns to S206 and S206 to S212 are repeated until all traces have been verified. One all traces are verified, at S214, verifying system 102 prepares an output of the trace-based verification of first data set for display on station 106.

In one example, the output may be in a tabular format and may include various known, or to be developed, identifiers to distinguish valid traces and entries from invalid/questionable traces. The output may also have an associated confidence (trustworthiness) score. Such confidence score may be an overall score for the results of verification of all traces in the entire data set and/or may be record specific such that each financial record in the first data set, after verification completion, receives a corresponding confidence score. Such confidence score(s) may be determined by verifying system 102 according to any known or to be developed method. For example, number of identified traces may be compared to total number of entries across all financial records of the organization and if such ratio is less than a predetermined and configurable threshold, the confidence score may be lowered and vice-versa. In another example, if a number of entries in a given financial record that is associated with a trace or with total number of traces is less than a predetermined and configurable threshold, then that given financial record may receive a low confidence score indicating that either insufficient entries thereof have been traced for validation or that insufficient number of entries exist in that table that undermine a trace-based data verification.

Determination of confidence score(s) and associated threshold(s) may be based on any known or to be developed machine learning method, where verifying system 102, over time, learns from processing and validating various data sets, proper thresholds and scales for such confidence score (s).

The output may also be visual, where confidence score(s) (overall or record specific) may be visually presented on display 106-1 in the form of a heat map, a Sankey flow diagram, pie chart, etc.

The output format is not limited to examples described above and may be in any other format, known or to be developed.

Figure 3A:
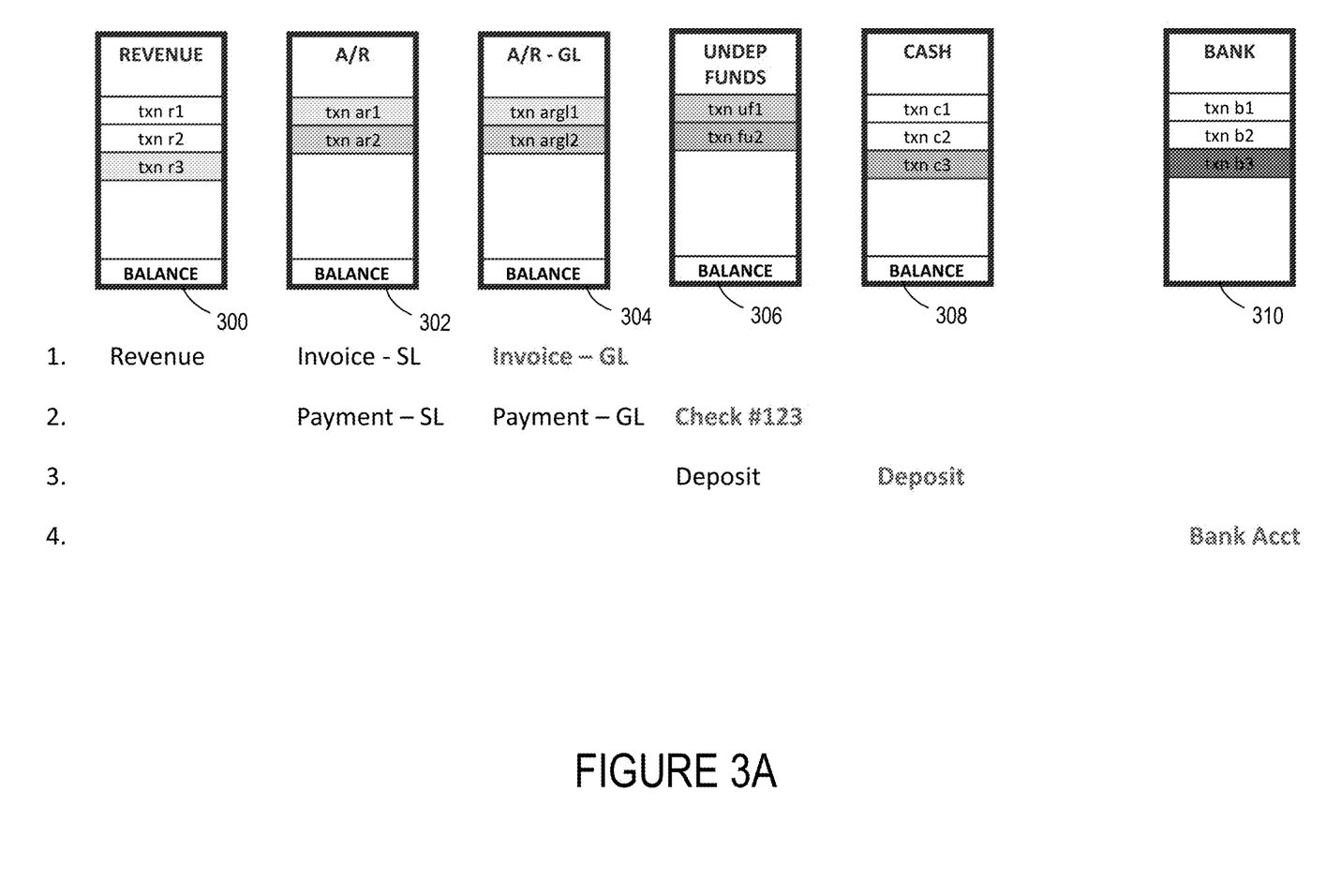
FIGS. 3A-C provides another illustration of the trace-based data verificaton process of FIG. 2, according to some aspects of the present disclosure.
Figure 3B:
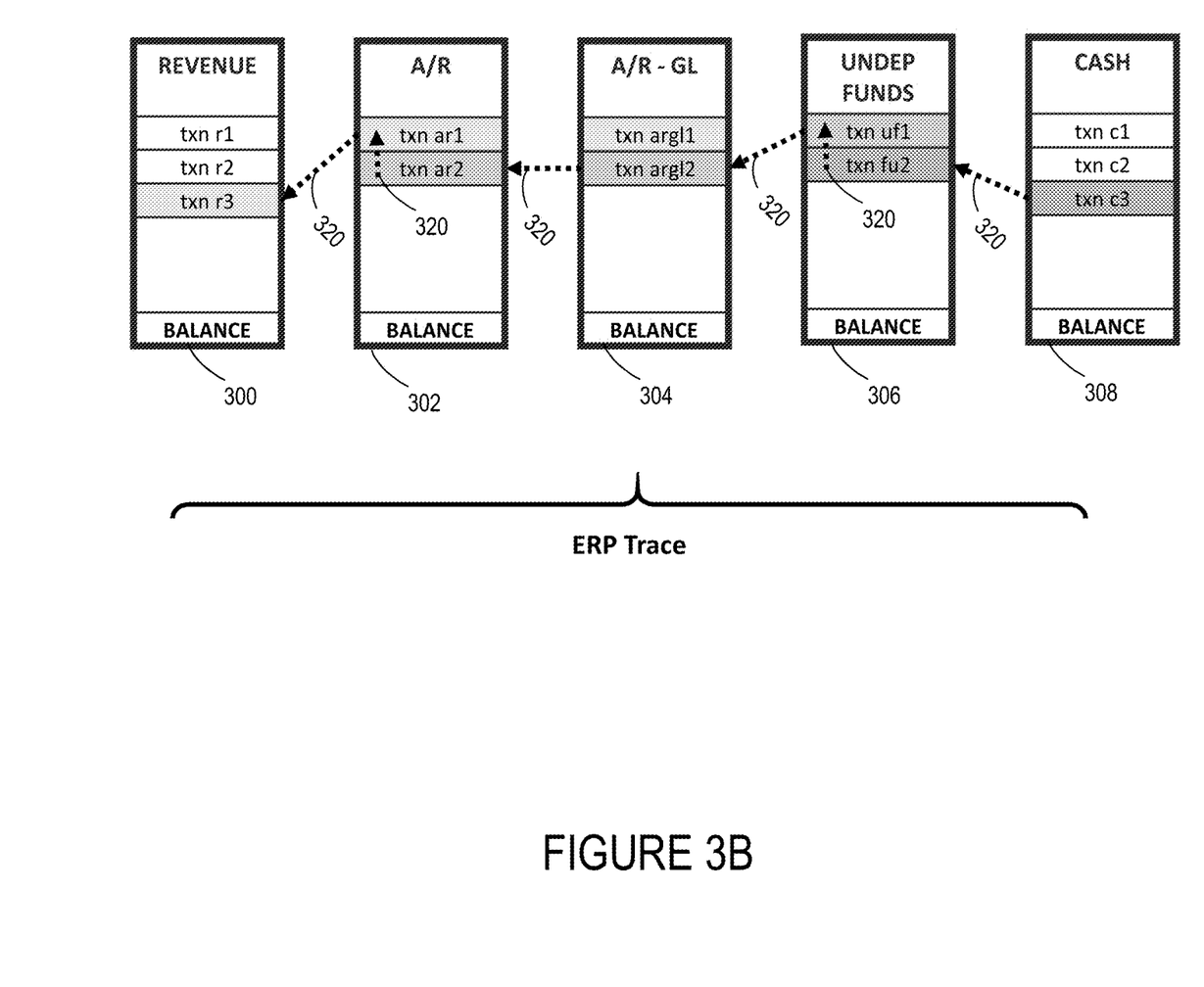
Figure 3C:
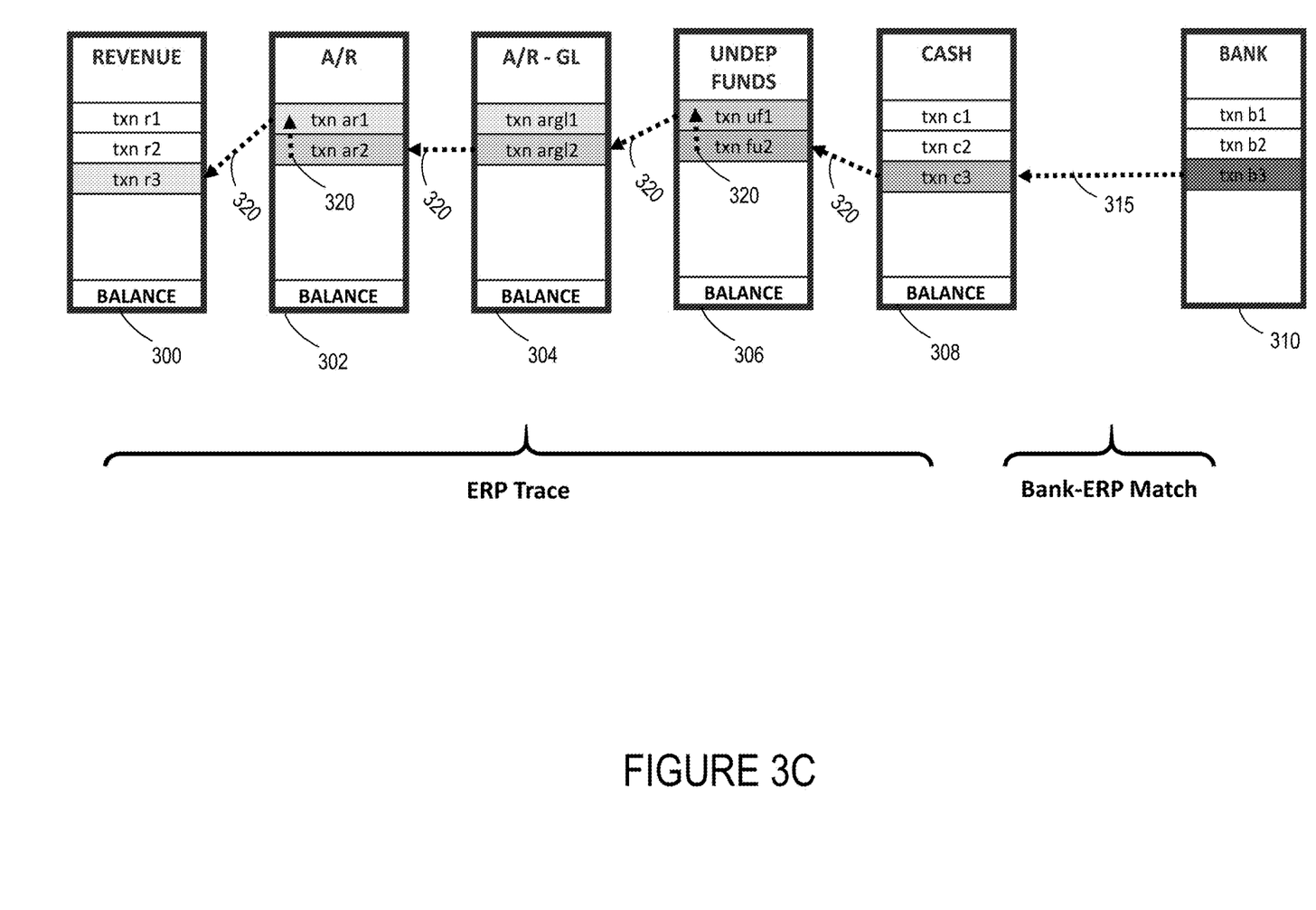

FIGS. 3A-C provides another illustration of the trace-based data verification process of FIG. 2, according to some aspects of the present disclosure.

FIG. 3A illustrates an example set of financial records and independently sourced data. Financial records 300, 302, 304, 306 and 308 may be the same as described above including, revenue, account receivables (A/R), A/R-GL, undeposited funds and cash journal, respectively, as shown. Independently sourced bank data 310 is also shown on the right.

Initially, revenue record 300, cash journal 308 and bank data 310 may have few entries (transactions, which are abbreviated as txn). For example, revenue record 300 may include txn r1 and txn r2. Cash journal 308 may have txn c1 and txn c2 while bank data 310 includes txn b1 and txn b2.

At step 1, when a new example transaction or financial record entry takes place (similar to the example described above), a new entry may be created in revenue record 300 (txn r3), in A/R 302 (txn ar1) and in A/R-GL 304 (txn arg11).

At step 2, a partial payment (check #123 shown in FIG. 3A) may be received for this transaction (which is yet to be deposited into the bank). Accordingly, at step 2, entry txn uf1 (corresponding to the partial payment) is created in undeposited funds record 306. This entry may result in an update to A/R 302 (txn ar2) and A/R-GL 304 (txn arg12).

At step 3, the partial payment may be deposited and thus appear as entry txn c3 in cash journal 308. This partial deposit also appears as txn fu2 in undeposited funds record 306. At step 4, the deposited partial payment appears as entry txn b3 in bank data 310.

In this example of FIG. 3A, all of txn r3, txn ar1, txn ar2, txn arg12, txn uf1, txn fu2 and txn c3 form a trace resulting from an original transaction, which is shown via dashed lines 320 resulting ERP trace in FIG. 3B (ERP trace). In other words, step S202 of FIG. 2 finds traces such as ERP trace in FIG. 3B.

FIG. 3C is visual illustration of process of S206, where an entry (txn b3) in independently sourced data (bank data 310) is matched with an entry (txn c3) in cash journal 308, shown via link 315. This is shown as Bank-ERP match in FIG. 3C.

As described with reference to FIG. 2, txn c3 (transaction or entry in first data set) that is matched with txn b3 (transaction or entry in second data set), is associated with a trace (ERP trace as described with reference to FIG. 3B) at step 208 and then the verification process is applied to ERP trace at S210, thus implementing the trace-based data verification of the present disclosure.

With examples of a trace-based data verification process described with reference to FIG. 2 and FIGS. 3A-C, FIG. 4 describes an example machine learning process and underlying deep learning neural network that can be utilized to determines sets of logic (rules) for identifying traces at S202 of FIG. 2. Such neural network and machine learning process can also be used for other purposes such as determination of confidence scores, creating outputs and heat maps, etc.

FIG. 4 illustrates an example neural architecture, according to some aspects of the present disclosure.

FIG. 4 illustrates an example neural architecture 400 of a neural network 410 defined by an example neural network description 402 in neural controller 401 (controller 401). Neural network description 402 can include a full specification of neural network 410, including neural architecture 400. For example, neural network description 402 can include a description or specification of architecture of neural network 410 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

Neural network 410 can reflect the architecture 400 defined in neural network description 402. In this non-limiting example, neural network 410 includes an input layer 403, which includes input data, which can be any type of data such as financial records and entries thereof as described above with reference to data sets 114 1-N and 116 1-N. In one illustrative example, input layer 403 can include data representing a portion of the input data, such as a subset of entries from each different type of financial record, as described above.

Neural network 410 can include hidden layers 404A through 404N (collectively "404" hereinafter). Hidden layers 404 can include n number of hidden layers, where n is an integer greater than or equal to one. The number of hidden layers can include as many layers as needed for a desired processing outcome and/or rendering intent. Neural network 410 further includes an output layer 406 that provides an output resulting from the processing performed by hidden layers 404 (e.g., where such output may be a trace identifying set of rules or logics utilized in finding traces in process of FIG. 2 as described above). In one illustrative example, output layer 406 can provide a logic defined as a description match of more than a threshold between entries across various financial records (where such threshold may be reconfigurable and determined based on experiments and/or empirical studies) to identify a trace.

Neural network 410, in this example, is a multi-layer neural network of interconnected nodes. Each node can represent a piece of information. Information associated with the nodes is shared among the different layers and each layer retains information as information is processed. In some cases, neural network 410 can include a feed-forward neural network, in which case there are no feedback connections where outputs of the neural network are fed back into itself. In other cases, neural network 410 can include a recurrent neural network, which can have loops that allow information to be carried across nodes while reading in input.

Information can be exchanged between nodes through node-to-node interconnections between the various layers. Nodes of input layer 403 can activate a set of nodes in the first hidden layer 404A. For example, as shown, each input node of input layer 403 is connected to each node of first hidden layer 404A. Nodes of hidden layer 404A can transform the information of each input node by applying activation functions to the information. The information derived from the transformation can then be passed to and can activate the nodes of the next hidden layer (e.g., 404B), which can perform their own designated functions. Example functions include data transformation, pooling, and/or any other suitable functions. The output of hidden layer (e.g., 404B) can then activate nodes of the next hidden layer (e.g., 404N), and so on. The output of last hidden layer can activate one or more nodes of output layer 406, at which point an output is provided. In some cases, while nodes (e.g., nodes 408A, 408B, 408C) in neural network 410 are shown as having multiple output lines, a node has a single output and all lines shown as being output from a node represent the same output value.

In some cases, each node or interconnection between nodes can have a weight that is a set of parameters derived from training neural network 410. For example, an interconnection between nodes can represent a piece of information learned about the interconnected nodes. The interconnection can have a numeric weight that can be tuned (e.g., based on a training dataset), allowing neural network 410 to be adaptive to inputs and able to learn as more data is processed.

Neural network 410 can be pre-trained to process the features from the data in input layer 403 using different hidden layers 404 in order to provide the output through the output layer 406. In an example in which neural network 410 is used to derive logics for identifying traces between various financial records, neural network 410 can be trained using training data that includes example data sets of financial records of different organizations. For instance, expense, account receivables, account payables, income statement, assets, among others, financial records can be input into neural network 410, which can be processed by the neural network 410 to generate outputs which can be used to tune one or more aspects of the neural network 410, such as weights, biases, etc.

In some cases, neural network 410 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training financial data until the weights of the layers are accurately tuned.

Neural network 410 can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 410 can represent any other neural or deep learning network, such as an autoencoder, a deep belief nets (DBNs), a recurrent neural networks (RNNs), etc.

With example process of trace-based data verification described above with reference to FIGS. 1-4, deficiencies and vulnerabilities of existing balance-based data verification approaches are addressed whereby a significantly larger number of entries of financial records are analyzed and verified thus increasing the credibility and trustworthiness of audited financial records of any given organization.

The disclosure now turns to description of example systems and device architectures that can be used as system components of setting 100 of FIG. 1 for implementing the above described trace-based data verification. For example, the architectures of FIGS. 4A and 4B can be used to implement verifying system 102 and its components (e.g., server 104 and station 106), databases of organization A 110, organization B 112, external source A 118 and/or external source B 122.

Figure 5A:
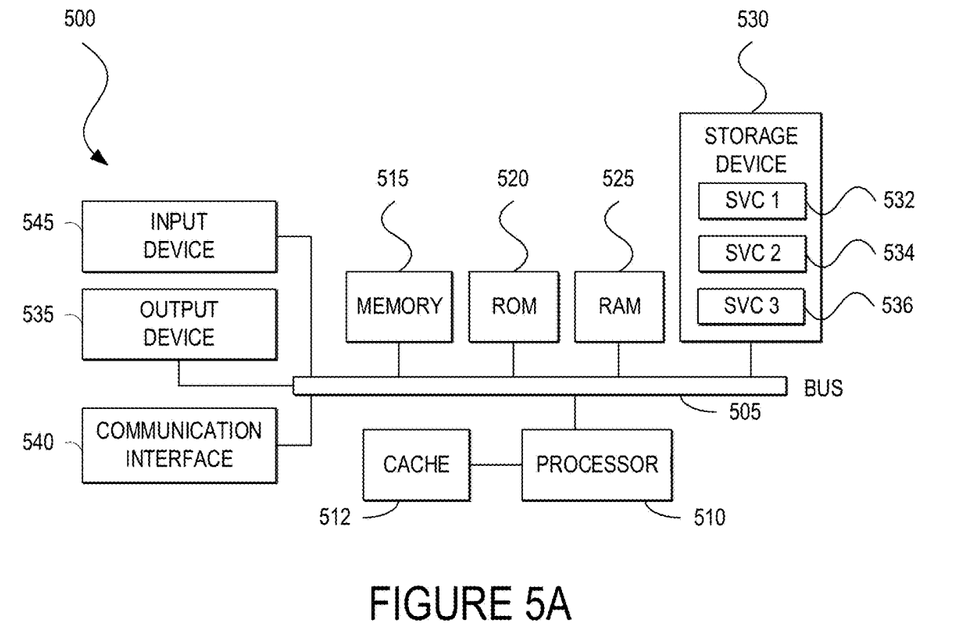
FIGS. 5A-B illustrate systems, according to some aspects of the present disclosure.
Figure 5B:
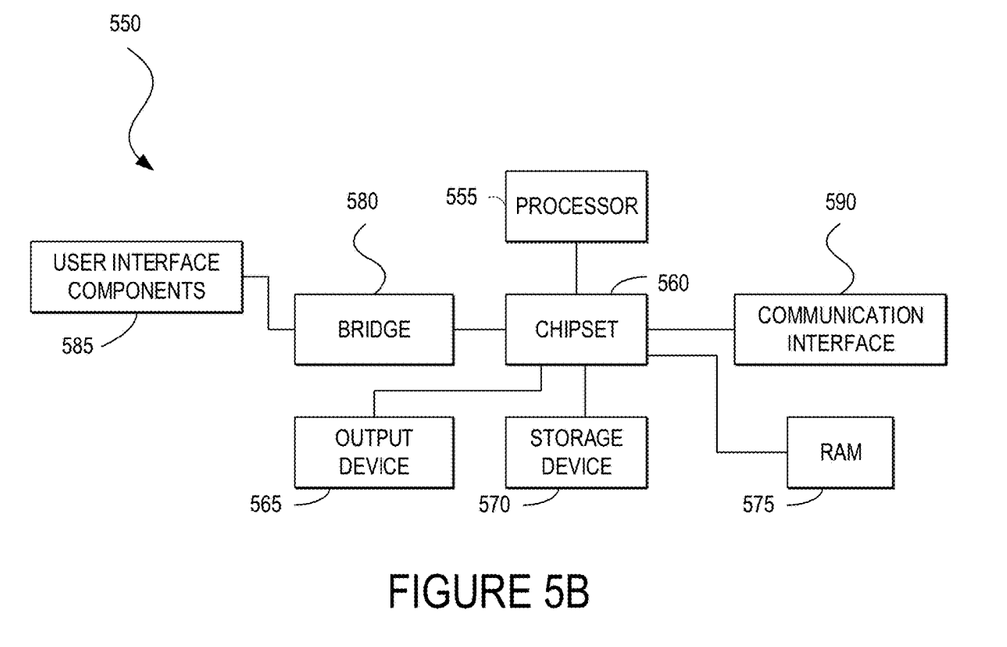

FIGS. 5A-B illustrate systems, according to some aspects of the present disclosure. The more appropriate system will be apparent to those of ordinary skill in the art when practicing the various embodiments. Persons of ordinary skill in the art will also readily appreciate that other systems are possible.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as services (SVC) 1 532, SVC 2 534, and SVC 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software SVCs 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A system comprising:
    memory having computer-readable instructions stored therein;
    a communication interface; and
    one or more processors configured to execute the computer-readable instructions to:
        access a first set of data including multiple discrete records stored in one or more internal databases of an entity by actively interfacing with one or more internal record keeping systems of the entity, wherein the system is a third-party system and the entity is associated with a subscription to the system;
        access a second set of data associated with the entity and stored in one or more external databases of an independent external institution using the communication interface, wherein the communication interface is communicatively coupled to the external databases;
        transform the first set of data to yield a transformed set of data that includes a set of traces by:
            applying a set of rules to the first set of data, wherein the set of rules are for associating two or more entries in the first set of data that have more than a threshold match with one another in accordance with one or more parameters corresponding to interconnections between one or more layers of the first set of data, wherein the set of rules are determined by a set of one or more activation functions, wherein a first activation function in the set derives transformation information and passes the derived transformation information to a next activation function in the set, and wherein the passed derived transformation information activates the next activation function associated with a next layer of the one or more layers; and
            identifying a set of traces for the first set of data based on the application of the set of rules, wherein a trace of the set of traces includes one or more groups of related entries from the multiple discrete records stored in the one or more internal databases of the entity in the first set of data using the set of rules, wherein the entries of each group are related in a common manner and linked by the trace of the set of traces;
        for each trace of the set of traces of the transformed set of data,
            automatically determine an association between at least one entry in the second set of data stored in the one or more external databases and at least one of the groups of related entries of the trace in the transformed set of data; and
            perform a verification process to determine that the at least one entry from the second set of data matches the at least one of the groups of related entries of the trace in the transformed set of data, wherein the verification process includes generating verification results associated with the trace in the transformed set of data and the second set of data;
        generate a visual representation based on the verification results of each trace of the set of traces of the transformed set of data; and
        display a graphical user interface that includes the visual representation.

2. The system of claim 1, wherein the set of rules are determined by a trained neural network and the trained neural network utilizes a deep learning neural network to determine the set of rules by interfacing one or more layers using interconnected nodes, wherein the one or more layers include at least:
    an input layer that includes the first set of data and the second set of data, an output layer that provides the set of rules in accordance with logic defining the threshold match, and at least one hidden layer that applies the set of one or more activation function.

3. The system of claim 2, wherein the trained neural network was trained using one or more training datasets corresponding to different types of data records including one or more of a balance sheet, an income statement, a cash journal, an account receivables statement, an account payables statement, an assets statement and a liability statement.

4. The system of claim 1, wherein the set of rules are determined in accordance with metadata associated with the first set of data.

5. The system of claim 1, wherein the visual representation includes a confidence score reflecting trustworthiness of the verification results.

6. The system of claim 1, wherein the visual representation includes a corresponding confidence score for each financial record of the first set of data that reflects trustworthiness of verification of a corresponding financial record.

7. The system of claim 1, wherein the visual representation includes a corresponding confidence score specific to each record of the first set of data that reflects trustworthiness of verification of the respective record.

8. The system of claim 1, wherein the first set of data is retrieved using an application programming interface.

9. One or more non-transitory computer-readable storage media comprising computer-readable instructions executable by one or more processors of a system to perform a method for automated data verification, the method comprising:
    access a first set of data including multiple discrete records stored in one or more internal databases of an entity by actively interfacing with one or more internal record keeping systems of the entity, wherein the system is a third-party system and the entity is associated with a subscription to the system;
    access a second set of data associated with the entity and stored in one or more external databases of an independent external institution, wherein a communication interface is communicatively coupled to the external databases;
    transform the first set of data to yield a transformed set of data that includes a set of traces by:
        applying a set of rules to the first set of data, wherein the set of rules are for associating two or more entries in the first set of data that have more than a threshold match with one in accordance with one or more parameters corresponding to interconnections between one or more layers of the first set of data, wherein the set of rules are determined by a set of one or more activation functions, wherein a first activation function in the set derives transformation information and passes the derived transformation information to a next activation function in the set, and wherein the passed derived transformation information activates the next activation function associated with a next layer of the one or more layers; and
        identifying a set of traces for the first set of data based on the application of the set of rules, wherein a trace of the set of traces includes one or more groups of related entries from the multiple discrete records stored in the one or more internal databases of the entity in the first set of data using the set of rules, and wherein the entries of each group are related in a common manner and linked by the trace of the set of traces;
    for each trace of the set of traces of the transformed set of data,
        automatically determine an association between at least one entry in the second set of data stored in the one or more external databases of the independent external institution and at least one of the groups of related entries of the trace in the transformed set of data; and
        perform a verification process to determine that the at least one entry from the second set of data matches the at least one of the groups of related entries of the trace in the transformed set of data, wherein the verification process includes generating verification results associated with the trace in the transformed set of data and the second set of data;
    generate a visual representation based on the verification results of each trace of the set of traces of the transformed set of data; and
    display a graphical user interface that includes the visual representation.

10. The one or more non-transitory computer-readable media of claim 9, wherein the set of rules are determined by a trained neural network and the trained neural network utilizes a deep learning neural network to determine the set of rules by interfacing one or more layers using interconnected nodes, wherein the one or more layers include at least:
    an input layer that includes the first set of data and the second set of data, an output layer that provides the set of rules in accordance with logic defining the threshold match, and
    at least one hidden layer that applies the set of one or more activation function.

11. The one or more non-transitory computer-readable media of claim 10, wherein the trained neural network was trained using one or more training datasets corresponding to different types of data records including one or more of a balance sheet, an income statement, a cash journal, an account receivables statement, an account payables statement, an assets statement and a liability statement.

12. The one or more non-transitory computer-readable media of claim 9, wherein the set of rules are determined in accordance with metadata associated with the first set of data.

13. The one or more non-transitory computer-readable media of claim 9, wherein the visual representation includes a confidence score reflecting trustworthiness of the verification results.

14. The one or more non-transitory computer-readable media of claim 9, wherein the visual representation includes a corresponding confidence score specific to each record of the first set of data that reflects trustworthiness of verification of the respective record.

15. The one or more non-transitory computer-readable media of claim 14, wherein the visual representation includes a heat map, the heat map visually reflecting the corresponding confidence score of all records of the first set of data.

16. The one or more non-transitory computer-readable media of claim 14, wherein the first set of data is retrieved using an application programming interface.

17. A method for automated data verification, the method comprising:
    accessing, by a system, a first set of data including multiple discrete records stored in one or more internal databases of an entity by actively interfacing with one or more internal record keeping systems of the entity, wherein the system is a third-party system and the entity is associated with a subscription to the system;

accessing, by the system, a second set of data associated with the entity and stored in one or more external databases of an independent external institution, the second set of data stored in one or more external databases of the external institution, wherein a communication interface is communicatively coupled to the external databases;

transforming, by the system, the first set of data to yield a transformed set of data that includes a set of traces by:

applying a set of rules to the first set of data, wherein the set of rules are for associating two or more entries in the first set of data that have more than a threshold match with one another in accordance with one or more parameters corresponding to interconnections between one or more layers of the first set of data, wherein the set of rules are determined by a set of one or more activation functions, wherein a first activation function in the set derives transformation information and passes the derived transformation information to a next activation function in the set, and wherein the passed derived transformation information activates the next activation function associated with a next layer of the one or more layers; and identifying a set of traces for the first set of data based on the application of the set of rules, wherein a trace of the set of traces includes one or more groups of related entries from the multiple discrete records stored in the one or more internal databases of the entity in the first set of data using the set of rules, and wherein the entries of each group are related in a common manner and linked by the trace of the set of traces;

for each trace of the set of traces of the transformed set of data, automatically determining, by the system, an association between at least one entry in the second set of data stored in the one or more external databases of the independent external institution and at least one of the groups of related entries of the trace in the transformed set of data; and performing, by the system, a verification process to determine that the at least one entry from the second set of data matches the at least one of the groups of related entries of the trace in the transformed set of data, wherein generating verification results associated with the trace in the transformed set of data and the second set of data;

generating, by the system, a visual representation based on the verification results of each trace of the set of traces of the transformed set of data; and displaying, on a display device communicatively coupled to the system, a graphical user interface that includes the visual representation.

18. The method of claim 17, wherein the set of rules are determined in accordance with metadata associated with the first set of data.

19. The system of claim 2, wherein the trained neural network is configured to automatically determine the association and perform the verification process for all traces in the set of traces to yield the verification results.

20. The one or more non-transitory computer-readable media of claim 10, wherein the trained neural network is configured to automatically determine the association and perform the verification process for all traces in the set of traces to yield the verification results.

* * * * *